US010641030B2

(12) United States Patent
Trundle et al.

(10) Patent No.: US 10,641,030 B2
(45) Date of Patent: May 5, 2020

(54) GARAGE DOOR AUTHENTICATION AND AUTOMATION

(71) Applicant: Alarm.com Incorporated, Tysons, VA (US)

(72) Inventors: Stephen Scott Trundle, Falls Church, VA (US); Alison Jane Slavin, Falls Church, VA (US); Bret Jutras, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/115,669

(22) Filed: Aug. 29, 2018

(65) Prior Publication Data

US 2019/0063140 A1 Feb. 28, 2019

Related U.S. Application Data

(60) Provisional application No. 62/551,411, filed on Aug. 29, 2017.

(51) Int. Cl.
*E05F 15/73* (2015.01)
*G07C 9/00* (2020.01)
*G06K 9/32* (2006.01)
*G08B 13/196* (2006.01)
*G06K 9/00* (2006.01)
*E05F 15/77* (2015.01)

(52) U.S. Cl.
CPC .......... *E05F 15/73* (2015.01); *G06K 9/00771* (2013.01); *G06K 9/325* (2013.01);
(Continued)

(58) Field of Classification Search
CPC ..... E05F 15/73; E05F 2015/767; E05F 15/77; G06K 9/325; G07C 9/00571;
(Continued)

(56) References Cited

U.S. PATENT DOCUMENTS 5,252,960 A 10/1993 Duhame
6,961,763 B1 11/2005 Wang et al.
(Continued)

OTHER PUBLICATIONS flashtoopen.com [online], "Flash to Open™ Open your garage door or gate with your high-beam switch", [retrieved on Aug. 29, 2018], retrieved from: https://flashtoopen.com/, 7 pages.
(Continued)

*Primary Examiner* — Hai Phan
*Assistant Examiner* — Anthony D Afrifa-Kyei
(74) *Attorney, Agent, or Firm* — Fish & Richardson P.C.

(57) ABSTRACT

A computer-implemented method, including receiving, by a monitoring system that is configured to monitor a property and from a sensor of the monitoring system, sensor data, receiving video data, determining that a vehicle is in a vicinity of the property based on the sensor data and the video data, comparing frames of the video data to an image of a known vehicle, determining a confidence score that reflects a likelihood that the vehicle in the vicinity of the property matches the known vehicle, based on determining that the confidence score that reflects the likelihood that the vehicle in the vicinity of the property matches the known vehicle satisfies a confidence score threshold, identifying an action that is performed by the vehicle, identifying a monitoring system action that corresponds to the action performed by the vehicle, and performing the monitoring system action.

18 Claims, 5 Drawing Sheets

(52) U.S. Cl.
CPC ....... *G06K 9/3241* (2013.01); *G07C 9/00571* (2013.01); *G07C 9/00896* (2013.01); *G08B 13/19602* (2013.01); *E05F 15/77* (2015.01); *E05F 2015/767* (2015.01); *E05Y 2900/106* (2013.01); *G06K 2209/15* (2013.01); *G06K 2209/23* (2013.01); *G07C 2009/00928* (2013.01)

(58) Field of Classification Search
CPC ...... G07C 9/00896; G07C 2009/00928; G08B 13/19602; E05Y 2900/106
See application file for complete search history.

(56) References Cited

U.S. PATENT DOCUMENTS

| | | |
|---|---|---|
| 2003/0043021 A1 | 3/2003 | Chung |
| 2004/0199785 A1 | 10/2004 | Pederson |
| 2004/0234136 A1* | 11/2004 | Zhu ..................... G06K 9/3241 382/224 |
| 2005/0057340 A1 | 3/2005 | Fitzgibbon |
| 2009/0251541 A1 | 10/2009 | Chew |
| 2010/0052947 A1 | 3/2010 | Lin et al. |
| 2010/0228608 A1 | 9/2010 | Hedley et al. |
| 2015/0125042 A1* | 5/2015 | Haden ................ G06K 9/00771 382/105 |
| 2015/0302737 A1 | 10/2015 | Geerlings et al. |
| 2015/0339869 A1 | 11/2015 | Szymke et al. |
| 2016/0110999 A1 | 4/2016 | Bulan et al. |
| 2016/0366858 A1* | 12/2016 | Seltzer ................. A01K 27/009 |
| 2018/0012462 A1* | 1/2018 | Heitz, III .......... G08B 13/19606 |
| 2018/0342329 A1* | 11/2018 | Rufo ..................... G16H 40/67 |
| 2018/0350213 A1* | 12/2018 | Bart ....................... H04N 7/186 |

OTHER PUBLICATIONS

PCT International Search Report in International Application No. PCT /US2018/048446, dated Nov. 2, 2018, 23 pages.

* cited by examiner

GARAGE DOOR AUTHENTICATION AND AUTOMATION

CROSS REFERENCE TO RELATED APPLICATIONS

This application claims benefit of U.S. Provisional Application No. 62/551,411, filed Aug. 29, 2017, and titled "Garage Door Authentication and Automation," which is incorporated by reference in its entirety.

TECHNICAL FIELD

This disclosure relates to property monitoring technology and, for example, utilizing video analytics to detect and authenticate a vehicle at a garage door of a monitored property.

BACKGROUND

Many people equip homes and businesses with monitoring systems to provide increased security for their homes and businesses.

SUMMARY

Techniques are described for monitoring technology. For example, techniques are described for integrating a monitoring system with one or more cameras and one or more sensors configured to detect a vehicle at the garage door of a monitored property. The monitoring system automatically opens the garage door based on authenticating the vehicle based the vehicle and the actions of the vehicle. The automated process of detecting the presence of a vehicle and authenticating the vehicle at the garage door of the property eliminates the need for the driver of the vehicle to search for a remote control to open the garage door.

According to an innovative aspect of the subject matter described in this application, a monitoring system that is configured to monitor a property, the monitoring system includes a sensor that is located at the property and that is configured to generate sensor data, a camera that is configured to capture video data, and a monitoring control unit that is configured to receive, from the sensor, the sensor data, receive, from the camera, the video data, based on the sensor data and the video data, determine that a vehicle is in a vicinity of the property, compare frames of the video data to an image of a known vehicle, based on comparing the frames of the video data to the image of the known vehicle, determine a confidence score that reflects a likelihood that the vehicle in the vicinity of the property matches the known vehicle, based on determining that the confidence score that reflects the likelihood that the vehicle in the vicinity of the property matches the known vehicle satisfies a confidence score threshold, identify an action that is performed by the vehicle, identify a monitoring system action that corresponds to the action performed by the vehicle, and perform the monitoring system action.

These and other implementations each optionally include one or more of the following optional features. The monitoring control unit is configured to perform a monitoring system action by opening the garage door. The monitoring control unit is configured to determine an armed status of the monitoring system, based on determining that the monitoring system is armed, increase the confidence score threshold, compare the confidence score that reflects a likelihood that the vehicle in the vicinity of the property matches the known vehicle to the increased confidence score threshold, based on determining that the confidence score that reflects a likelihood that the vehicle in the vicinity of the property matches the known vehicle exceeds the increased confidence score threshold, identify the action that is performed by the vehicle, identify the monitoring system action that corresponds to the action performed by the vehicle by identifying the monitoring system actions of disarming the monitoring system and opening a garage door of the property, and perform the monitoring system action by disarming the monitoring system and opening the garage door.

The monitoring control unit is configured to determine an armed status of the monitoring system, and based on determining that the monitoring system is unarmed, decrease the confidence score threshold, compare the confidence score that reflects a likelihood that the vehicle in the vicinity of the property matches the known vehicle to the decreased confidence score threshold, based on determining that the confidence score that reflects a likelihood that the vehicle in the vicinity of the property matches the known vehicle exceeds the decreased confidence threshold, identify the monitoring system action that corresponds to the action performed by the vehicle, identifying the monitoring system action that corresponds to the action performed by the vehicle by identifying the monitoring system actions of disarming the monitoring system and opening a garage door of the property, and perform the monitoring system action by opening the garage door and switching a light at the property. The monitoring control unit is configured to determine that a door between the garage and an interior of the property is opened, and close the garage door a predetermined period of time after determining that a door from the garage into the property is opened.

The monitoring control unit is configured to perform the monitoring system action by opening a garage door of the property and closing the garage door a predetermined period of time after determining that a light in the property in switched on. The sensor that is located at the property and that is configured to generate sensor data is an inductive proximity sensor that is configured to detect a change in the electromagnetic field of the sensor based on the vehicle being within a threshold distance of the sensor. The sensor that is located at the property and that is configured to generate sensor data is a motion sensor. The monitoring control unit is configured to determine a confidence score that reflects the likelihood that the vehicle in the vicinity of the property matches the known vehicle by determining a first confidence score that reflects a likelihood that a license plate number of the vehicle in the vicinity of the property matches a license plate number of the known vehicle, determining a second confidence score that reflects a likelihood that a model of the vehicle in the vicinity of the property matches a model of the known vehicle, determining a third confidence score that reflects a likelihood that a color of the vehicle in the vicinity of the property matches a color of the known vehicle, and determining the confidence score based on the first confidence score, the second confidence score, and the third confidence score.

The monitoring control unit is configured to receive the image of the known vehicle and an additional image of an additional known vehicle, receive a license plate number for the known vehicle and an additional license plate number for the additional known vehicle, receive model data for the known vehicle and additional model data for the additional known vehicle, receive color data for the known vehicle and additional model data for the additional known vehicle, receive data identifying the action to be performed by the known vehicle to allow, and an additional action to be performed by the additional known vehicle, receive data identifying the monitoring system action that corresponds to the action and an additional monitoring system action that corresponds to the second action, and store the image of the known vehicle and the image of the additional known vehicle, the license plate number for the known vehicle and the license plate number for the additional known vehicle, the model data for the known vehicle and the model data for the additional known vehicle, the color data for the known vehicle and the color data for the additional known vehicle, and the data identifying an action to be performed by known vehicle, and an action to be performed by the additional known vehicle.

The monitor control unit is configured to compare the frames of the video data to the image of the known vehicle by comparing the frames of the video data to both the image of the known vehicle and the additional image of the additional known vehicle, based on comparing the frames of the video data to the image of the known vehicle, determine a first confidence score that reflects a likelihood that the vehicle in the vicinity of the property matches the known vehicle and determine a second confidence score that reflects a likelihood that the vehicle in the vicinity of the property matches the additional known vehicle, compare the first confidence score that reflects a likelihood that the vehicle in the vicinity of the property matches the known vehicle and the second confidence score that reflects a likelihood that the vehicle in the vicinity of the property matches the additional known vehicle to a confidence score threshold, based on comparing the first confidence score and the second confidence score, determine that the first confidence score does not satisfy the threshold and the second confidence score satisfies the confidence score threshold; based on determining that the first confidence score does not satisfy the threshold and the second confidence score satisfies the confidence score threshold, identify an action that is performed by the vehicle, determine whether the action performed by the vehicle matches the action to be performed by the additional vehicle, based on determining that the action performed by the vehicle matches the action to be performed by the additional known vehicle, identifying a monitoring system action that corresponds to the action performed by the vehicle by identifying the monitoring system action of opening a garage door of the property, and perform the monitoring system action by opening the garage door.

The monitoring control unit is configured to receive, from the sensor, additional sensor data, receive, from the camera, additional video data, based on the additional sensor data and the additional video data, determine that a vehicle is in a vicinity of the property, compare frames of the additional video data to an image of a known vehicle, based on comparing the frames of the additional video data to the image of the known vehicle, determine a confidence score that reflects a likelihood that the vehicle in the vicinity of the property matches the known vehicle, based on determining that the confidence score that reflects the likelihood that the vehicle in the vicinity of the property matches the known vehicle does not satisfy a confidence score threshold, perform a monitoring system action by arming the monitoring system and maintaining a garage door in a closed state. The monitoring control unit is configured to perform a monitoring system action by generating an audible alarm at the property. The monitoring control unit is further configured to communicate a notification to a user device of a resident of the property, the notification indicating that a vehicle is in the vicinity of the property, and including one or more images of the unknown vehicle, receive, from the user device of a resident of the property, data indicating that the vehicle in the vicinity of the property should be granted access to the property, based on receiving data indicating that the vehicle in the vicinity of the property should be granted access to the property, disarming the monitoring system and opening the garage door, storing the one or more images of the vehicle, and updating a list of known vehicles to include the vehicle.

The monitoring control unit is configured to receive data indicating that the action to be performed by the vehicle is a distress signal, identify the action that is performed by the vehicle by identifying the distress signal, identify a monitoring system action that corresponds to the action performed by the vehicle by identifying the monitoring system action of contacting authorities based on the distress signal known distress signal, and perform the monitoring system action by contacting the authorities. The monitoring control unit is configured to based on determining that the confidence score that reflects the likelihood that the vehicle in the vicinity of the property matches the known vehicle satisfies a confidence score threshold, identify an action that is performed by the vehicle by identifying a series of high beam and low beam headlight emissions from the vehicle. The monitoring control unit is configured to based on determining that the confidence score that reflects the likelihood that the vehicle in the vicinity of the property matches the known vehicle satisfies a confidence score threshold, identify an action that is performed by the vehicle by identifying a left hand side indicator switching on for a first period of time followed by a right hand side indicator switching on for a second period of time.

According to another innovative aspect of the subject matter described in this application, a computer-implemented method includes receiving, by a monitoring system that is configured to monitor a property and from a sensor of the monitoring system, sensor data, receiving, by the monitoring system and from a camera, video data, determining, by the monitoring system, that a vehicle is in a vicinity of the property based on the sensor data and the video data, comparing, by the monitoring system, frames of the video data to an image of a known vehicle, based on comparing the frames of the video data to the image of the known vehicle, determining, by the monitoring system, a confidence score that reflects a likelihood that the vehicle in the vicinity of the property matches the known vehicle, based on determining that the confidence score that reflects the likelihood that the vehicle in the vicinity of the property matches the known vehicle satisfies a confidence score threshold, identifying, by the monitoring system, an action that is performed by the vehicle, identifying a monitoring system action that corresponds to the action performed by the vehicle, and performing the monitoring system action.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating a monitoring system with one or more cameras and one or more sensors configured to detect a vehicle at the garage door of a monitored property. When the vehicle at the garage door is authenticated, the garage door is automatically opened eliminating the need for the driver of the vehicle to search for a remote control to open the garage door. For example, each of the one or more cameras may be positioned on a lower portion of the exterior wall of the monitored property to capture the license plate of the vehicle. The entire driveway of the monitored property may be monitored by the one or more cameras so that the field of view of at least one of the one or more cameras covers each square inch of the driveway.

The video data captured by the one or more cameras is communicated to a control unit of the monitoring system. The control unit compares the license plate of the vehicle in the drive way to a known license plate to determine whether there is a license plate match. The control unit then performs a variety of video analytic techniques to analyze the received video to detect cues within the actions of the vehicle as it approaches the garage door. For example, the video analytics may be used to detect when the vehicle approaches the driveway, drives half way up the driveway, pauses for five seconds, and then continues up the driveway. Based on the control unit determining the license plate on the vehicle matches a known license plate, the vehicle matches a known vehicle, and the actions of the vehicles match a sequence of known actions, the control unit authenticates the vehicle. The control unit commands the garage door to open based on authenticating the vehicle in the driveway.

Figure 1:
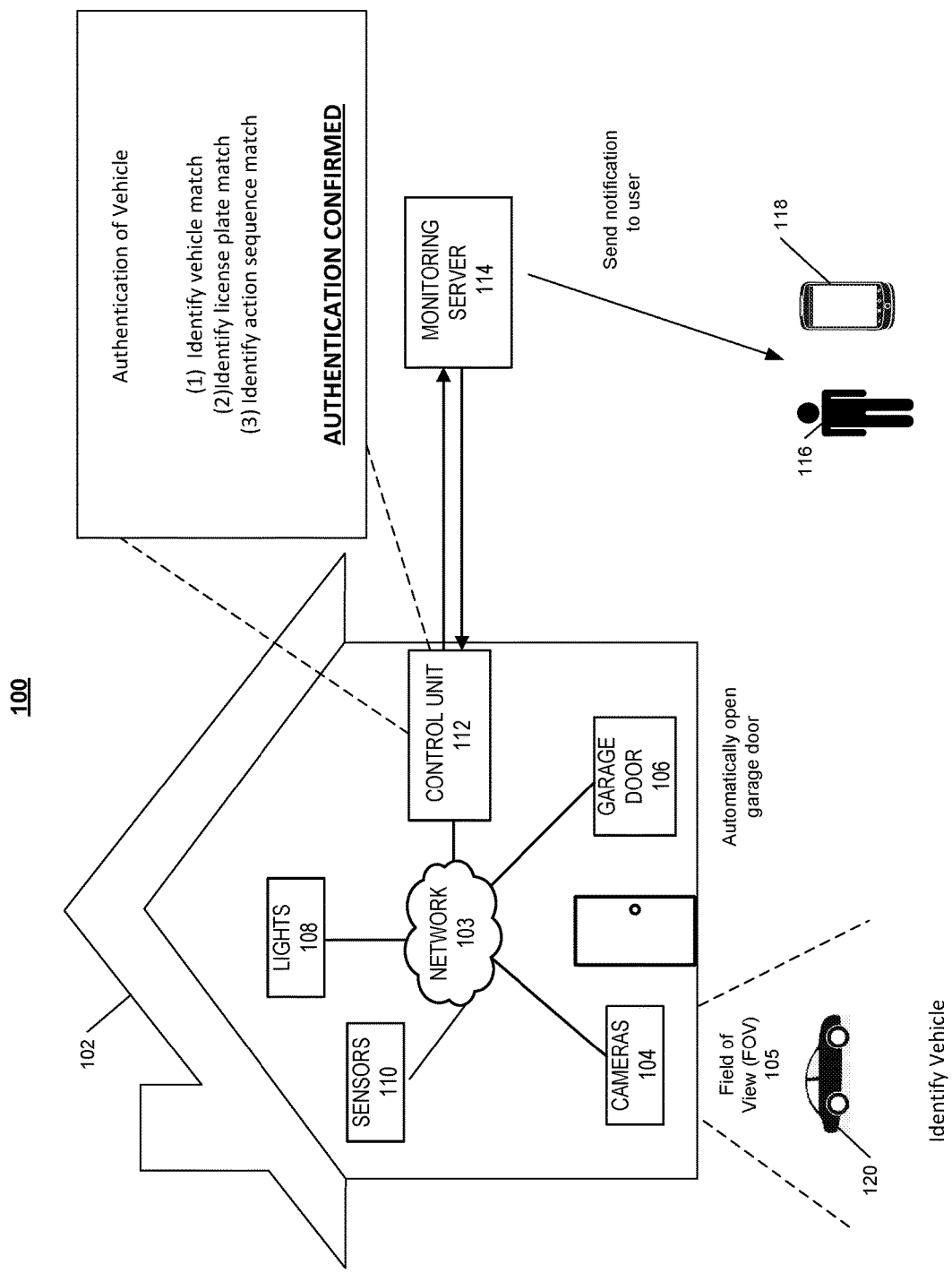
FIG. 1 illustrates and example of a system for utilizing video analytics to detect and authenticate a vehicle at a monitored property.

FIG. 1 illustrates an example of a monitoring system 100 integrated with one or more cameras 104 and one or more sensors 110. As shown in FIG. 1, a property 102 (e.g. a home) of a user 116 is monitored by an in-home monitoring system (e.g. in-home security system) that includes components that are fixed within the property 102. The in-home monitoring system may include a control unit 112, one or more cameras 104, one or more sensors 110, one or more lights 108, and a garage door 106. The user 116 may integrate the one or more cameras 104 and one or more sensors 110 with a garage door opener into the in-home monitoring system to eliminate the need for the driver of the vehicle to search for a remote control to open the garage door to the monitored property 102.

In the example shown in FIG. 1, a vehicle 120 may approach the driveway of the monitored property 102. When the vehicle is within the field of view (FOV) 105 of at least one of the one or more cameras 104, the at least one camera may capture video data of the vehicle and the license plate on the vehicle 120. In some examples, the monitoring property 102 may be equipped with one or more proximity sensors. Each of the one or more proximity sensors may be configured to detect changes in the electromagnetic field of the sensor to sense when a vehicle is in close proximity to the sensor. The proximity sensor may be mounted to an external wall near the garage door 106, and when the sensor detects the vehicle 120, the one or more cameras 104 may be promoted to capture video data.

The video data captured by the one or more cameras 104 are communicated to the control unit 112. The control unit 112 may store in memory data associated with the one or more vehicles of the residents of the monitored property. For example, the control unit 112 may store one or more images of the vehicles of the residents, one or more images of the one or more license plates of the residents, and may store each license plate number and the associated licensing state data. The control unit 112 may compare the received license plate image data to the stored license plate data to confirm whether the detected vehicle 120 is a known vehicle. The control unit 112 is configured to automatically open the garage door when the action of a known vehicle is authenticated.

In some implementations, the control unit 112 may authenticate the vehicle 120 based on a three step authentication process. The authentication process may involve identifying a vehicle match, identifying a license plate match, and identifying an action sequence match. In these implementations, the vehicle is only authenticated when the control unit 112 can identify a match for the vehicle, the license plate, and the action sequence of the vehicle. In other implementations, the control unit 112 may authenticate the vehicle when a vehicle match is identified, the action sequence of the vehicle is identified, and a partial match of the license plate is identified. For example, when the control unit receives partial images of the license plate of the vehicle, and confirms a match of the first three characters of the license plate. The control unit 112 may identify that the vehicle matches the vehicle type (color, model, etc.) of the known vehicle of a resident, and may identify that the vehicle turns the windshield wipers on and off two times to confirm a match of the action sequence performed by the vehicle. In some implementations, the control unit 112 may be configured to identify unique characteristics of known vehicles to authenticate the vehicle. For example, the control unit may analyze the received video data of the vehicle to identify fixtures, trimmings, scratches, and other unique physical characteristics of the vehicle. Identifying these characteristics may help to strengthen the vehicle match determination. In other implementations, the control unit 112 may authenticate the vehicle when the control unit identifies a license plate match and a vehicle match. When the vehicle is authenticated, the control unit 112 waits to receive video data of the vehicle's actions to determine whether to command the garage door 106 to be opened.

In some implementations, the authentication process may change based on the armed status of the in-home monitoring system. When the in-home monitoring system is armed away, the system may require that the vehicle, the license plate, and the vehicle authentication action match a known vehicle, license plate, and vehicle authentication action. In some examples, the system may require the control unit 112 to identify a match between the driver of the vehicle and known drivers associated with the monitored property. For example, when the system is armed away, the system must identify that Joe is driving a known vehicle with a known license plate, that has performed the vehicle authentication action for the garage door to automatically open. In these examples, the in-home monitoring system may automatically disarm when the garage door 106 is opened. When the in-home monitoring system is armed stay, the system may require that a subset of the vehicle, license plate, and vehicle authentication action are matched. For example, when the system is armed stay, the system may require that the vehicle and the vehicle authentication action match the known vehicle and the known vehicle authentication action. When the in-home monitoring system is unarmed, the system may that a subset of the vehicle, license plate, and vehicle authentication action are matched.

In some implementations, the control unit 112 may process the video data to calculate a confidence score that reflects the confidence of the system identifying a vehicle match, a license plate match, and a vehicle authentication action match. The control unit 112 compares the calculated confidence score to a threshold value to determine whether or not to open the garage door. When the in-home monitoring system is armed away, the system may set the threshold value to be higher than the threshold value when the system is disarmed. In other words, when the system is armed away, the threshold for automatically opening the garage door is higher than when the system is disarmed.

The control unit 112 may implement the use of one or more algorithms and neural networking to make determinations of the actions from the collected video data. The control unit 112 may utilize training sets of data to improve the algorithms used to detect actions from the video data received from the one or more cameras 104. The control unit 112 may be trained by the user 116 to detect the vehicle authentication actions identified by the user 116. The user 116 may set the system to a training mode and provide confirmation of an action. For example, while the system is in training mode the user may provide true or false responses based on reviewing video data of different actions in the video data. The user 116 may review the video data and the determination made by the control unit 112 to respond whether the determination was true or false. Receiving user feedback while in training mode helps the control unit to improve the algorithms used to make the determinations. In some implementations, the control unit 112 communicates the captured video data to the monitoring server 114. In these implementations, the monitoring server, which is located remotely from the monitored property 102, may perform the video analytics on the video data and communicate the determinations to the control unit 112. In some implementations, the training data may be captured by the control unit 112 automatically when the user 116 opens the garage door 106 with a remote.

In the examples where the video data is communicated from the control unit 112 to the monitoring server 114 for analyzing, the monitoring server 114 may receive one or more trained data sets from one or more other homes. The monitoring server 114 may be in communication with several other control units at other homes. The one or more users from each of the one or more other homes may configure their monitoring system for garage door automation based on authenticating a vehicle and detecting the vehicle actions. Each of the users may set their systems in a training mode and may provide true or false responses based on reviewing video data of different vehicle actions in the captured video data. The trained data sets may be used to improve the algorithms to increase the accuracy of the determinations. Receiving user feedback from the one or more users from one or more other homes while in the training mode allows the monitoring server to continuously strengthen the determinations made. In other implementations, the one or more cameras 104 may perform the video analytics.

The user 116 may log into a monitoring application that runs on the user device 118 to set the one or more vehicle authentications actions. For example, the user may set pulling halfway up the driveway, flashing the headlights on and off two times, then continuing up the driveway as an authentication action. For another example, the user may set pausing for five seconds at the beginning of the driveway, followed by accelerating to the midpoint of the drive way as an authentication action. The user 116 may set a vehicle authentication action for each of the one or more vehicles of the one or more residents of the monitored property. For example, Jane may drive vehicle A and may set a particular sequence of events as her authentication action, Joe may drive vehicle B and may set a different sequence of events as his authentication action. In some implementations, the user 116 may set one sequence of events for the authentication action for each of the one or more vehicles of the residents of the property 102.

The user 116 may also log into the monitoring application to set up vehicle authentication actions for one or more visitors to the monitored property. For example, the user 116 may set up a vehicle authentication action for the family nanny. The user 116 may enter details such as the nanny's vehicle make and type, the nanny's vehicle license plate number, and set an action of flashing the vehicle headlights on and off five times into the monitoring application. In some examples, the user 116 may provide one or more images of the visitors' vehicles and the associated license plate numbers. The user 116 may also set a time limitation for allowing a visitor to utilize the garage door automation feature. For example, the user may set the nanny's garage automation for 9 AM to 5 PM on week days only. In some implementations, the user may set a different vehicle action for each visitor, in other implementations, the user may set the vehicle action for each visitor to be the same.

When the control unit 112 confirms the authentication of the vehicle 120, the control unit 112 sends a command to the garage door 106 to open. The garage door 106 automatically opens to allow the vehicle 120 access to the garage. The garage door 106 may remain open for a set period of time and then may close automatically. In some examples, the garage door 106 remains open until the user 116 closes it. In some implementations, the user 116 may set an action that authenticates the vehicle to open the garage door and simultaneously disarms the in-home security system. For example, when the control unit authenticates the vehicle, license plate, and vehicle actions, the garage door is automatically opened, and the security system is simultaneously disarmed. In some examples, when the vehicle and the vehicle actions are authenticated, and the in-home security system is disarmed, the control unit may automatically unlock and open one or more interior doors of the monitored property. In these examples, the interior doors of the monitored property may be configured with smart door knobs that allow the control unit to automatically lock/unlock and open and close the interior doors. When the control unit 112 authenticates a vehicle and the vehicle actions, the control unit 112 may command the garage door to open, and may command the interior door that leads to the garage, and the door to the master bedroom to unlock and open. The user may set up a door open/close and lock/unlock pattern through the monitoring application. Based on the user set pattern, the control unit 112 determines which of the one or more interior doors to open and unlock. In some implementations, the control unit 112 may be configured to identify the driver of the vehicle from the captured video data. The system may configure the one or more devices within the property based on the preferences of the identified driver. For example, the thermostat may be set to 72 degrees Fahrenheit, and one or more lights are switched on when John is identified as the driver of the vehicle.

The armed status of the in-home security system may affect the actions taken by the control unit 112 when the control unit authenticates the vehicle 120 in the driveway. When the in-home security system is armed away, the control unit 112 may automatically disarm the security system, open the garage door, and may turn on one or more lights 108 throughout the monitored property 102. For example, the control unit may turn on the garage light, and switch on one or more lights that light the pathway to the master bedroom. When the in-home security system is disarmed, the control unit 112 may assume that the monitored property is occupied. The control unit 112 may receive data from the one or more sensors and cameras throughout the monitored property to confirm the control unit's determination. Based on the control unit 112 confirming that the property is occupied by at least one occupant, the control unit may open the garage door, and simultaneously generate an output from a speaker within the property that notifies the occupant of the arrival of the vehicle. For example, the control unit may generate an output "John has arrived" based on authenticating John's vehicle when the in-home system was disarmed.

The control unit 112 may send a notification to the mobile device 118 of the user 116 to notify the user 116 when the garage door opened for the vehicle 120. The notification may include one or more captured images of the vehicle 120. In some implementations, the notification is communicated from the monitoring server 114.

In some implementations, the user 116 may configure the system with a distress action. The distress action may be a discrete action that may be used by the user 116 to signal distress. The user 116 may log into the monitoring application to set an action that may be used to signal that a driver of a vehicle that approaches the driveway is in distress. For example, a criminal may attempt to gain access to the monitored property by hijacking a vehicle with access to the garage. The vehicle may be equipped with a panic button that causes the headlight to flash several times in a couple seconds. When the vehicle approaches the garage door 106, the driver may press the panic button to signal to the control unit 112 that the driver is in distress. Based on recognizing the distress signal, the control unit 112 does not open the garage door even if the vehicle is authenticated. In some examples, the control unit 112 communicates the detected distress signal to the monitoring server 114 which in turn communicates with the server systems of one or more authorities. In other examples, the control unit 112 sounds an audible alarm at the property 102.

The control unit may store in its memory one or more known vehicles that should not initiate an authentication process. These known vehicles may be vehicles that have pulled into the driveway of the monitored property 102 but do not wish to gain access to the garage. These vehicles may include delivery trucks, mail delivery trucks, service vehicles, or the vehicle of a visitor. For example, when a delivery vehicle approaches the garage of the property, a camera may begin to capture video data of the vehicle. The video data is communicated to the control unit 112, and the control unit may store one or more images of the delivery vehicle. The vehicle would not be authenticated and the garage door would not automatically open for the delivery vehicle. When a delivery vehicle approaches the garage door in a future instance, a camera may begin to capture video data, the control unit may determine that the vehicle is a delivery vehicle based on the vehicle having similar characteristics as the previous delivery vehicle. For example, the control unit may perform analytics to confirm that the logo on the vehicle matches the logo on the delivery vehicle. Based on the control unit determining that the logo on the vehicle matches the logo on a delivery vehicle, the control unit determines that the vehicle is a delivery vehicle and does not begin the authentication process. The control unit 112 may prompt the one or more cameras to stop capturing video data of a delivery vehicle.

Figure 2:
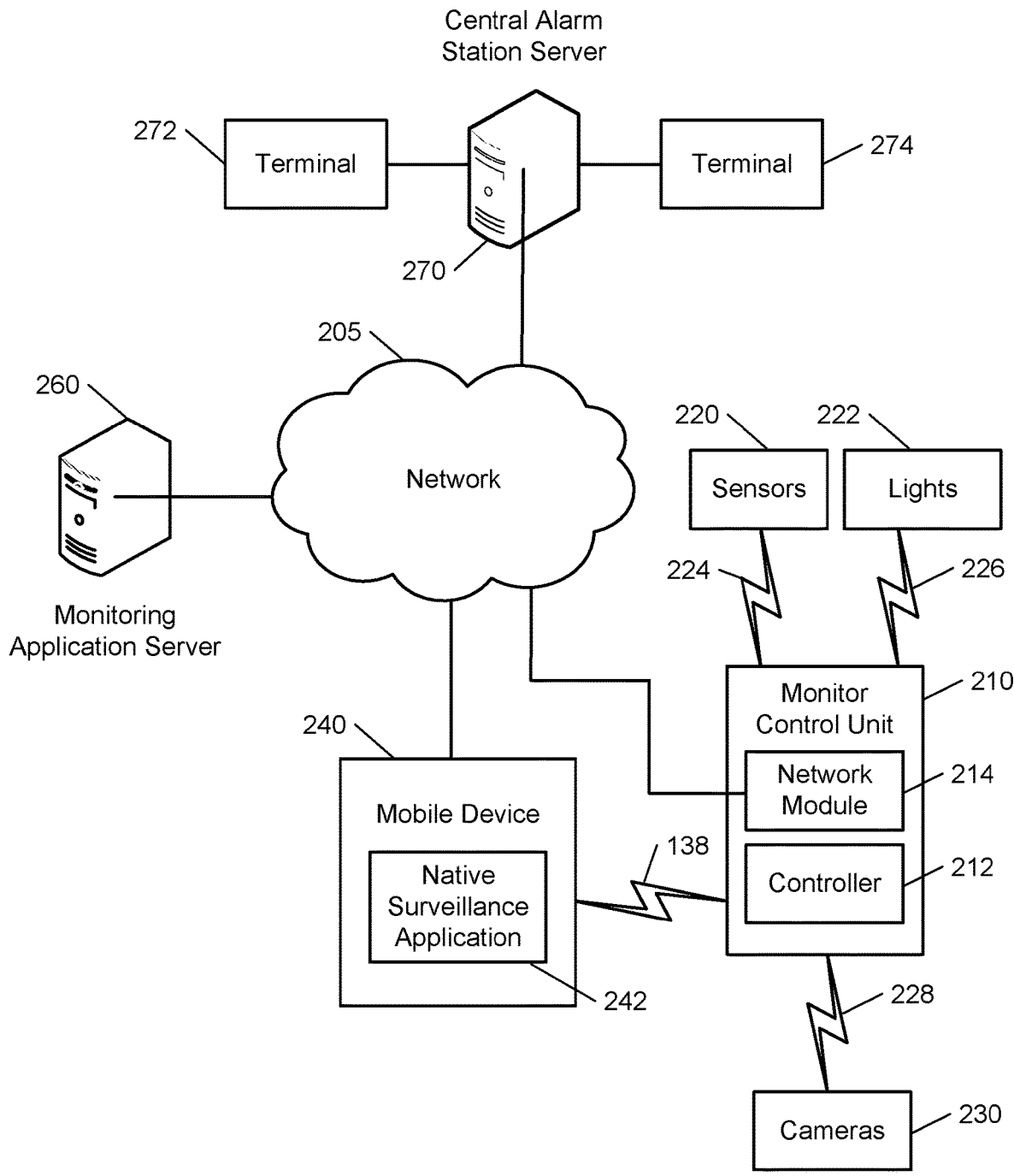
FIG. 2 illustrates an example of a monitoring system integrated with one or more cameras and one or more sensors.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag. The sensors 220 may include a one or more metal induction proximity sensors. The metal induction proximity sensors are configured to detect the metal of a vehicle when the vehicle moves close to the proximity sensor. The one or more proximity sensors may be configured to detect the changes in the electromagnetic field of a sensor caused by a metal object moving close to the sensor.

The monitoring system may one or more other cameras 230. Each of the one or more cameras 230 may be video/photographic cameras or other type of optical sensing device configured to capture images. For instance, the cameras may be configured to capture images of an area within a building monitored by the monitor control unit 210. The cameras may be configured to capture single, static images of the area and also video images of the area in which multiple images of the area are captured at a relatively high frequency (e.g., thirty images per second). The cameras may be controlled based on commands received from the monitor control unit 210.

The cameras may be triggered by several different types of techniques. For instance, a Passive Infra Red (PIR) motion sensor may be built into the cameras and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The sensors 220, the lights 222, and the cameras 230 communicate with the controller 212 over communication links 224, 226, and 228. The communication links 224, 226, and 228 may be a wired or wireless data pathway configured to transmit signals from the sensors 220, the touchless doorbell device 222, and the cameras 230 to the controller 212. The communication link 224, 226, and 228 may include a local network, such as, 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a monitoring application 242. The monitoring application 242 refers to a software/firmware program running on the corresponding mobile device that enables the user interface and features described throughout. The user device 240 may load or install the monitoring application 242 based on data received over a network or data received from local media. The monitoring application 242 runs on mobile devices platforms, such as iPhone, iPod touch, Blackberry, Google Android, Windows Mobile, etc. The monitoring application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication. Other arrangements and distribution of processing is possible and contemplated within the present disclosure.

Figure 3:
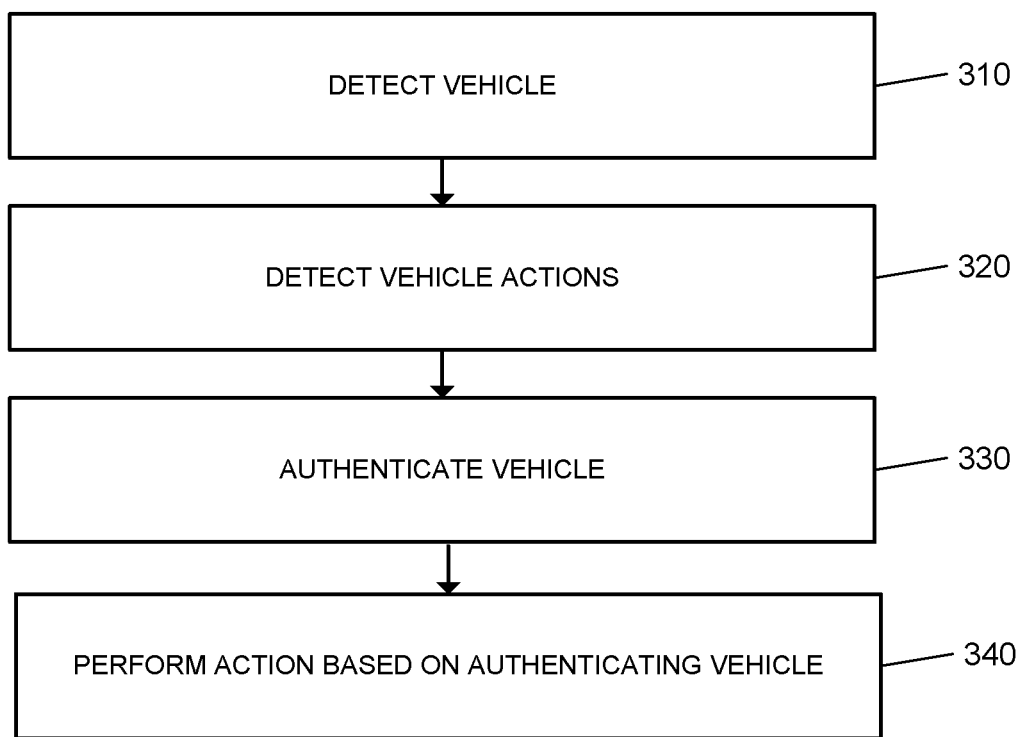
FIG. 3 is a flow chart of an example process for performing an action based on authenticating a vehicle.

FIG. 3 illustrates an example process 300 for performing an action based on authenticating a vehicle. The one or more cameras 104 detect a vehicle in the driveway of the monitored property (310). The one or more cameras 104 may be mounted to an external wall of the monitored property 102, and each of the one or more cameras 104 may be configured to pan and or tilt to change it's field of view. The one or more cameras may be triggered to capture video data and still images when motion is detected in the driveway of the monitored property 102. The one or more cameras 104 may communicate the captured video data and still images to the control unit 112 of the monitored property 102. In some implementations, the monitoring property 102 may include one or more metal induction proximity sensors. The metal induction proximity sensors are configured to detect the metal in a vehicle when the vehicle moves close to the proximity sensor. The one or more proximity sensors may be mounted to the external wall of the monitored property near to the garage door. In some examples, the proximity sensors may be mounted along the side of the driveway. In some examples, the monitored property is equipped with one proximity sensor, in other examples, the monitored property is equipped with multiple proximity sensors. When the vehicle 120 moves up the driveway, the metal vehicle causes changes the electromagnetic field of the one or more proximity sensors, and the vehicle is detected based on the changes in the field of the one or more sensors. The one or more proximity sensors may communicate the data to the control unit 112, and the control unit may confirm the detection of the vehicle based on video and or image data received from the one or more cameras 104.

The control unit detects the vehicle actions (320). The one or more cameras 104 begin capturing video data when the vehicle is detected in the drive way of the monitored property 102. The video data captured by the one or more cameras 104 is communicated to the control unit 112. The control unit 112 may be configured to interpret the video data to identify vehicle actions that the user configured as authentication actions. The control unit 112 may implement the use of or more algorithms and neural networking to make determinations of the vehicle actions. For example, the user 116 may identify an action of switching the vehicle headlights on and off twice in a row as an authentication action, and the control unit may analyze the captured data to identify this vehicle action. In some implementations, the video data is communicated to the monitoring server 114, and the monitoring server 114 uses one or more algorithms to determine whether the vehicle actions align with the user set authentication action.

The control unit authenticates the vehicle (330). In some implementations, the vehicle is authenticated when the control unit identifies a vehicle match, a license plate match, and authenticates the vehicle actions. The control unit 112 determines a vehicle match when the vehicle that approaches the driveway matches a known vehicle. The control unit 112 may store in memory one or more images of known vehicles. The images of one or more known vehicles may be manually input by the user 116 through the monitoring application running on the user's mobile device 118. The user may manually input information such as the year, make, model, and color of the vehicle. The user may also manually enter the license plate number of the vehicle. The control unit 112 determines a license plate match when the license plate on the vehicle matches the stored records for the license plate for that vehicle. The control unit 112 may determine a license plate match when the control unit determines the vehicle matches the known vehicle, and the control unit determines a match of at least a subset of the characters of the license plate match. In examples where the user has not manually input the data associated with a vehicle, the control unit 112 may identify a vehicle as a known vehicle when the vehicle has previously entered the garage. For example, the control unit 112 may capture video and images of the one or more vehicles that enter the garage of the monitored property, and may store a log of the vehicles that entered. The control unit authenticates the vehicle actions when there is a vehicle match, a license plate match, and the vehicle performs a particular sequence of events. The particular sequence of events may be a sequence of events set by the user 116. For example, the user may set switching the windshield wipers on and off three times as an authentication action. In another example, the user may set pausing at the foot of the drive way and flashing your headlights once, followed by turning the windshield wipers on and off as an authentication action. The user has the ability to set an authentication action for each of a one or more vehicles, and may have the ability to constantly customize the authentications actions of the one or more vehicles. In some implementations, the user sets one authentication action for each of the one or more vehicles authorized to enter the garage.

The control unit performs an action based on authenticating the vehicle (340). Based on authenticating the vehicle, the control unit 112 sends a command to the garage door 106 to open for the vehicle 120. In some implementations, the in-home security system may automatically disarm when the vehicle is authenticated and the garage door opens. In some implementations, the control unit 112 may command one or more other devices at the monitored property to perform actions based on authenticating the vehicle. For example, the control unit may command one or more lights throughout the property to switch on. In another example, the control unit may command the one or more water sprinklers to switch on.

Figure 4:
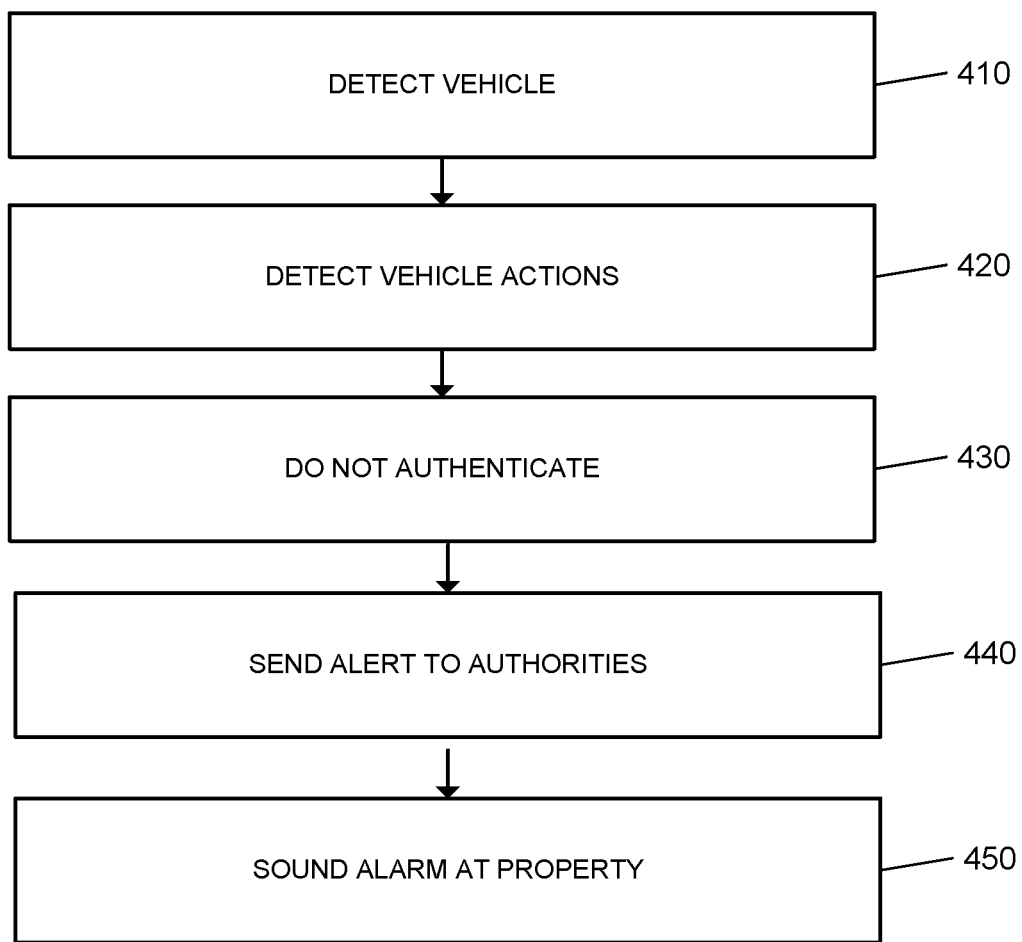
FIG. 4 illustrates an example of a system for sounding an alarm at the monitored property.

FIG. 4 illustrates an example process 400 for sounding an alarm at the property. The one or more cameras 104 detect a vehicle in the driveway of the monitored property (410). The one or more cameras 104 may be mounted to an external wall of the monitored property 102, and each of the one or more cameras 104 may be configured to pan and or tilt to change its field of view. The one or more cameras may be triggered to capture video data and still images when motion is detected in the driveway of the monitored property 102. The one or more cameras 104 may communicate the captured video data and still images to the control unit 112 of the monitored property 102. In some implementations, the monitoring property 102 may include one or more metal induction proximity sensors. The metal induction proximity sensors are configured to detect the metal vehicle when the vehicle moves close to the proximity sensor. The one or more proximity sensors may be mounted to the external wall of the monitored property near to the garage door. In some examples, the proximity sensors may be mounted along the side of the driveway. In some examples, the monitored property is equipped with one proximity sensor, in other examples, the monitored property is equipped with multiple proximity sensors. When the vehicle 120 moves up the driveway, the metal vehicle causes changes the electromagnetic field of the one or more proximity sensors, and the vehicle is detected based on the changes in the field of the one or more sensors. The one or more proximity sensors may communicate the data to the control unit 112, and the control unit may confirm the detection of the vehicle based on video and or image data received from the one or more cameras 104.

The control unit detects the vehicle actions (420). The one or more cameras 104 begin capturing video data when the vehicle is detected in the drive way of the monitored property 102. The video data captured by the one or more cameras 104 is communicated to the control unit 112. The control unit 112 may be configured to interpret the video data to identify vehicle actions that the user configured as authentication actions. The control unit 112 may implement the use of or more algorithms and neural networking to make determinations of the vehicle actions. For example, the user 116 may identify an action of switching the vehicle headlights on and off twice in a row as an authentication action, and the control unit may analyze the captured data to identify this vehicle action. In some implementations, the video data is communicated to the monitoring server 114, and the monitoring server 114 uses one or more algorithms to determine whether the vehicle actions align with the user set authentication action.

The control unit does not authenticate the vehicle (430). The control unit does not authenticate the vehicle when at least one of the vehicle, the license plate, or the vehicle actions are not confirmed. For example, the control unit does not authenticate the vehicle when there is a vehicle license plate match but there is not a vehicle match. The control unit may determine that the license plate on the vehicle matches the license plate of a known vehicle, but the vehicle does not match the known vehicle. For example, the control unit may analyze the video data of the vehicle to determine that the vehicle does not match the color, make, or model of the known vehicle. In some examples, the control unit may determine that the vehicle does not match the known vehicle based on determining that unique characteristic of the known vehicle are not identified. For example, the vehicle may be the same make, model, and color of the known vehicle but may not have the same rims. The control unit 112 will not authenticate the vehicle when the vehicle performs the distress signal actions.

The control unit sends an alert to the authorities (440). Based on the control unit failing to authenticate the vehicle, the control unit communicates an alert to the server systems of the relevant authorities. In some implementations, the alert is communicated to the monitoring server 114, and the monitoring server in turn communicated to the server systems of the relevant authorities. The control unit sounds an alarm at the monitored property (450). The control unit 112 commands the alarm system at the monitored property to generate an audible alarm.

Figure 5:
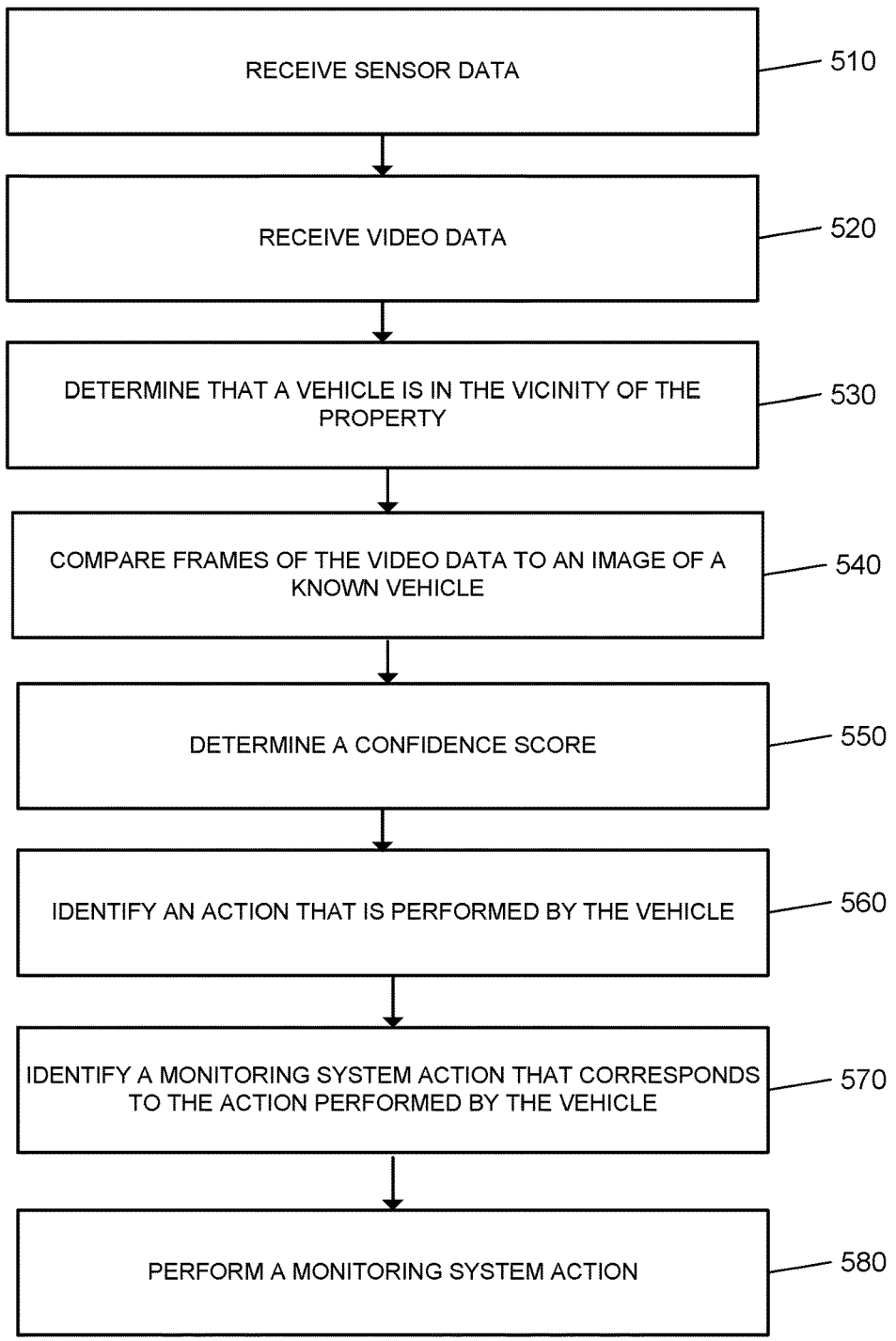
FIG. 5 illustrates an example process for performing a monitoring system action.

FIG. 5 illustrates an example process 500 for performing a monitoring system action. The monitoring system includes one or more cameras and one or more sensors that are configured to detect a vehicle in the vicinity of the property 102. Specifically, the one or more sensors may be configured to detect when a vehicle is approaching the garage door of a monitored property 102. The monitoring control unit receives sensor data (510). The resident of a monitored property 102 may integrate a proximity sensor near the garage door 106. The proximity sensor is configured to detect changes in the electromagnetic field of the sensor to sense when a vehicle is in close proximity to the sensor. When the proximity sensor detects a change in the electromagnetic field of the sensor, the sensor communicates the sensed data to the monitoring control unit 112. In some implementations, the resident of the monitored property 102 integrates one or more motion sensors near the garage door 106. The one or more motion sensors are configured to sense motion in the vicinity of the garage door 106. When at least one of the motion sensors detects motion near the garage door 106, the sensor communicates the sensor data to the monitoring control unit 112.

The monitoring control unit receives video data (520). The resident of the monitored property 102 may integrate the monitoring system with one or more cameras that are configured to capture video data of the areas near the garage door 106 of the monitored property 102. In some implementations, the one or more cameras are prompted to capture video data when an object moves into the field of view (FOV) of at least one of the cameras. In other implementations, the monitoring control unit 112 commands the one more cameras to capture video data when the monitoring control unit 112 receives data from the proximity sensor indicating that a vehicle is in the vicinity of the garage door 106. The monitoring control unit 112 determines that a vehicle is in the vicinity of the property 102 based on the sensor data and the video data (530). The monitoring control unit 112 analyzes the received sensor data and the received video data to determine that a vehicle is in the vicinity of the property 102. In the described examples, where the one or more motion sensors and the one or more cameras are located near to the garage door 106 of the monitored property 102, the monitoring control unit 112 determines the vehicle is in the vicinity of the garage door 106.

The monitoring control unit compares frames of the video data to an image of a known vehicle (540). The resident of the monitored property 102 may grant access to one or more vehicles that are associated with the residents of the property 102. The resident may register the one or more vehicles through a monitoring application that runs on a user device. The resident may provide one or more images of the each of the one or more vehicles that to be stored as known vehicles that are allowed access to the garage of the monitored property 102. The resident may also provide the license plate number, the color, and the vehicle model data associated with each of the one or more known vehicles. The monitoring control unit 112 may utilize one or more video analytics techniques to analyze the one or more frames of the video data, and to compare the one or more frames of the video data to the images of the one or more vehicles.

The monitoring control unit determines a confidence score that reflects a likelihood that the vehicle in the vicinity of the property matches the known vehicle based on comparing the frames of the video data to the image of the known vehicle (550). Based on the monitoring control unit 112 using the one or more different analytics techniques to compare the images of the vehicle in the vicinity of the property 102 to the images of the one or more known vehicles, the monitoring control unit 112 determines a confidence score. For example, the monitoring control 112 unit may determine that the vehicle in the vicinity of the property 102 is a known vehicle A with a confidence of 85%. In some implementations, the monitoring control unit 112 is configured to identify unique characteristics of the known vehicles. Identifying fixtures, trimming, scratches, any/or any other unique characteristics of the vehicle increases the confidence of the monitoring control unit's 112 determinations.

In some implementations, the monitoring control unit 112 determines a first confidence score that reflects a likelihood that the license plate number of the vehicle in the vicinity of the property 102 matches the license plate number of a known vehicle. In these implementations, the monitoring control unit 112 compares the frames of the video that include the license plate or frames that include a part of the license plate to the license plate data provided by the resident. The first confidence score may be lower in examples where the frames of the video include only a partial license plate number. The monitoring control unit 112 determines a second confidence score that reflects a likelihood that a model of the vehicle in the vicinity of the property 102 matches a model of the known vehicle. The monitoring control unit 112 compares the frames of the video that include features that determine the model of the vehicle to the images of the one or more known vehicles. For example, the monitoring control unit 112 compares the frames of the video that include features such as the front bumper that includes the logo for the brand vehicle, and the back bumper. In some implementations, the monitoring control unit 112 may access images of vehicles from the internet. For example, during configuration of a known vehicle, the resident may provide the color, license plate, model, and one or more images of the known vehicle. The monitoring control unit 112 may access one or more images of the same model of vehicle from the internet. These one or more images may be saved by the monitoring control unit 112 and analyzed when determining a confidence score.

The monitoring control unit 112 determines a third confidence score that reflects a likelihood that a color of the vehicle in the vicinity of the property matches a color of the known vehicle. The monitoring control unit 112 compares the frames of the video to determine a color of the vehicle in the vicinity of the property. The monitoring control unit 112 then compares the determined color of the car to the one or more colors of the one or more known vehicles. The confidence score may be lower in examples where the monitoring control unit 112 cannot distinguish the color of the vehicles. For example, the monitoring control unit 112 may determine a lower confidence score when distinguishing between white and silver, silver and gray, white and off white car.

In some implementations, the monitoring control unit 112 may determine a confidence score for the likelihood that the vehicle in the vicinity of the property 102 is a known vehicle based on averaging the first, second, and third confidence scores. In other implementations, the monitoring control unit 112 may determine a confidence score for the likelihood that the vehicle in the vicinity of the property 102 is a known vehicle based on a weighted average of the first, second, and third confidence score.

In some implementations, the monitoring control unit 112 may initiate a security action based on determining a license plate match and determining the model and color of the vehicle does not match a known vehicle. For example, a potential burglar may place a counterfeit license plate, that matches the license plate of a known vehicle on a vehicle that is different from the model and color of the known vehicle. The monitoring control unit 112 may determine a confidence score of 95% that reflects the likelihood that the license plate number matches the license plate number of the known vehicle, and a confidence score of 10% that reflects the likelihood that the model of the vehicle matches the known vehicle. The monitoring control unit 112 may communicate a notification to the resident of the property 102 indicating a potential risk. In some implementations, the monitoring control unit 112 may generate an audible alarm at the property 102.

In some implementations, the monitoring control unit 112 adjusts the confidence score that reflects a likelihood that the vehicle in the vicinity of the property 102 matches the known vehicle based on the armed status of the monitoring system. The monitoring control unit 112 may increase the confidence score threshold when the monitoring system is armed. The monitoring control unit 112 then compares the confidence score to the increased confidence score threshold. When the confidence score satisfies the increased confidence score threshold, the monitoring control unit 112 identifies the action performed by the vehicle. The monitoring control unit 112 may decrease the confidence score threshold when the monitoring system is disarmed. The monitoring control unit 112 compares the confidence score to the decreased confidence score threshold. When the confidence score satisfies the decreased confidence score threshold, the monitoring control unit 112 identifies the action performed by the vehicle.

The monitoring control unit identifies an action that is performed by the vehicle based on determining that the confidence score that reflects the likelihood that the vehicle in the vicinity of the property matches the known vehicle satisfies a confidence score threshold (560). The monitoring control unit 112 compares the confidence score that reflects the likelihood that the vehicle in the vicinity of the property 102 matches the known vehicle to a confidence score threshold. When the confidence score satisfies the confidence score threshold, the monitoring control unit 112 further analyzes the video data to identify the one or more actions performed by the vehicle. The one or more cameras capture video data when the vehicle approaches the property 102. In some implementations, where the property 102 includes a driveway that leads to the garage door 106, the one or more cameras initiate video capture when the vehicle moves into the FOV of at least one camera, and the one or more cameras capture vide data as the vehicle drives up the driveway. The one or more cameras communicate the captured video data to the monitoring control unit 112. The monitoring control unit 112 may utilize one or more algorithms and neural networking techniques to identify the one or more actions of the vehicle as the vehicle approaches the garage door. For example, the monitoring control unit 112 may identify that the vehicle hazard lights are switched on as the vehicle approaches the garage door.

In some implementations, the monitoring control unit 112 may utilize training sets of data to improve the one or more algorithms used to identify the one or more actions of the vehicle from the video data. In these implementations, the resident may train the monitoring control unit 112 to identify actions when the system is in a training mode. When in training mode, the determinations made by the monitoring control unit 112 are confirmed based on user feedback. When the monitoring system is in training mode the user may provide true or false responses based on reviewing video data of different vehicle actions. The resident may review the video data and the determination made by the monitoring control unit 112 to respond whether the determination was true or false. Receiving user feedback while in training mode helps the monitoring control unit 112 to improve the algorithms used to make the determinations. In some implementations, the control unit 112 communicates the captured video data to the monitoring server 114. In these implementations, the monitoring server, which is located remotely from the monitored property 102, may perform the video analytics on the video data and communicate the determinations to the monitoring control unit 112. In some implementations, the training data may be captured by the control unit 112 automatically when the resident opens the garage door 106 with a remote.

The monitoring control unit identifies a monitoring system that corresponds to the action performed by the vehicle (570). The resident may provide one or more vehicle authentication actions that must be performed by each of the known vehicles for the vehicle to access the garage. In some implementations, the resident may set the same vehicle authentication actions for each of the one or more known vehicles. In other examples, the resident may set a different set of vehicle authentication actions for each of the one or more known vehicles. The user may also configure specific monitoring system actions to perform based on the different vehicle authentication actions. For example, the user may configure the monitoring control unit 112 to automatically disarm the monitoring system and open the garage door based on identifying a known vehicle switching between the high and low beam while approaching the garage door. For another example, the user may configure the monitoring control unit 112 to automatically disarm the monitoring system, open the garage door, and switch on one or more interior lights at the property 102 based on identifying a known vehicle switching on their headlights and switching on the windshield wipers. For another example, the user may configure the monitoring control unit 112 to open the garage door and turn on the sprinklers. The resident has the ability to configure the vehicle authentication actions and the monitoring system action that is performed in response to identifying the vehicle actions through the monitoring application.

The monitoring control unit performs the monitoring system action (580). The monitoring control unit 112 performs the monitoring system action that corresponds to the action performed by the vehicle. For example, the monitoring control unit 112 automatically opens the garage door and simultaneously disarms the monitoring system based on identifying the vehicle flashing the left indicator followed by flashing the right indicator. In some implementations, the resident may configure the system with a distress action. The distress action may be a discrete action that may be used by a vehicle approaching the garage door to signal distress. For example, a criminal may attempt to gain access to the monitored property 102 by hijacking a driver with a vehicle that has access to the garage. The vehicle may be equipped with a panic button that causes the headlight to flash several times in a couple seconds. When the vehicle approaches the garage door 106, the driver may attempt to press the panic button to signal that the driver is in distress. When the monitoring control unit 112 identifies the distress signal, the monitoring control unit 112 does not open the arms the monitoring control unit 112 and does not open the garage door. In some examples, the monitoring control unit 112 contacts the authorities to dispatch to the monitored property. In other examples, the monitoring control unit 112 sounds an audible alarm at the property 102.

In some implementations, the monitoring control unit 112 automatically opens the garage door 106 and automatically closes the garage door after a set period of time. In other implementations, the monitoring control unit 112 opens the garage door and automatically closes the garage door when the door from the garage into the property 102 is opened. In another implementations, the monitoring control unit 112 opens the garage door and automatically closes the garage door when a light in the interior of the property 102 is switched on.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
    a sensor that is located at the property and that is configured to generate sensor data;
    a camera that is configured to capture video data; and
    a monitoring control unit that is configured to:
        receive, from the sensor, the sensor data;
        receive, from the camera, the video data;
        based on the sensor data and the video data, determine that a vehicle is in a vicinity of the property;
        compare frames of the video data to an image of a known vehicle;
        based on comparing the frames of the video data to the image of the known vehicle, determine a confidence score that reflects a likelihood that the vehicle in the vicinity of the property matches the known vehicle;
        based on determining that the confidence score that reflects the likelihood that the vehicle in the vicinity of the property matches the known vehicle satisfies a confidence score threshold, identify an action that is performed by the vehicle by:
            identifying a series of high beam and low beam headlight emissions from the vehicle; or
            identifying a left hand side indicator switching on for a first period of time followed by a right hand side indicator switching on for a second period of time;
        identify a monitoring system action that corresponds to the action performed by the vehicle; and
        perform the monitoring system action.

2. The monitoring system of claim 1, wherein the monitoring control unit is configured to perform a monitoring system action by opening a garage door.

3. The monitoring system of claim 1, wherein the monitoring control unit is configured to:
    determine an armed status of the monitoring system;
    based on determining that the monitoring system is armed, increase the confidence score threshold;
    compare the confidence score that reflects a likelihood that the vehicle in the vicinity of the property matches the known vehicle to the increased confidence score threshold;
    based on determining that the confidence score that reflects a likelihood that the vehicle in the vicinity of the property matches the known vehicle exceeds the increased confidence score threshold, identify the action that is performed by the vehicle;
    identify the monitoring system action that corresponds to the action performed by the vehicle by identifying the monitoring system actions of disarming the monitoring system and opening a garage door of the property; and
    perform the monitoring system action by disarming the monitoring system and opening the garage door.

4. The monitoring system of claim 1, wherein the monitoring control unit is configured to:
    determine an armed status of the monitoring system; and
    based on determining that the monitoring system is unarmed, decrease the confidence score threshold;
    compare the confidence score that reflects a likelihood that the vehicle in the vicinity of the property matches the known vehicle to the decreased confidence score threshold;
    based on determining that the confidence score that reflects a likelihood that the vehicle in the vicinity of the property matches the known vehicle exceeds the decreased confidence threshold, identify the monitoring system action that corresponds to the action performed by the vehicle;
    identifying the monitoring system action that corresponds to the action performed by the vehicle by identifying the monitoring system actions of disarming the monitoring system and opening a garage door of the property; and
    perform the monitoring system action by opening the garage door and switching a light at the property.

5. The monitoring system of claim 4, wherein the monitoring control unit is configured to:
    determine that a door between the garage and an interior of the property is opened; and
    close the garage door a predetermined period of time after determining that the door from the garage into the property is opened.

6. The monitoring system of claim 1, wherein the monitoring control unit is configured to perform the monitoring system action by opening a garage door of the property and closing the garage door a predetermined period of time after determining that a light in the property in switched on.

7. The monitoring system of claim 1, wherein the sensor that is located at the property and that is configured to generate sensor data is an inductive proximity sensor that is configured to detect a change in the electromagnetic field of the sensor based on the vehicle being within a threshold distance of the sensor.

8. The monitoring system of claim 1, wherein the sensor that is located at the property and that is configured to generate sensor data is a motion sensor.

9. The monitoring system of claim 1, wherein the monitoring control unit is configured to determine a confidence score that reflects the likelihood that the vehicle in the vicinity of the property matches the known vehicle by:
    determining a first confidence score that reflects a likelihood that a license plate number of the vehicle in the vicinity of the property matches a license plate number of the known vehicle;
    determining a second confidence score that reflects a likelihood that a model of the vehicle in the vicinity of the property matches a model of the known vehicle;
    determining a third confidence score that reflects a likelihood that a color of the vehicle in the vicinity of the property matches a color of the known vehicle; and
    determining the confidence score based on the first confidence score, the second confidence score, and the third confidence score.

10. The monitoring system of claim 1, wherein the monitoring control unit is configured to:
    receive the image of the known vehicle and an additional image of an additional known vehicle;

receive a license plate number for the known vehicle and an additional license plate number for the additional known vehicle;

receive model data for the known vehicle and additional model data for the additional known vehicle;

receive color data for the known vehicle and additional model data for the additional known vehicle;

receive data identifying the action to be performed by the known vehicle to allow, and an additional action to be performed by the additional known vehicle;

receive data identifying the monitoring system action that corresponds to the action and an additional monitoring system action that corresponds to the second action; and store the image of the known vehicle, the image of the additional known vehicle, the license plate number for the known vehicle, the license plate number for the additional known vehicle, the model data for the known vehicle, the model data for the additional known vehicle, the color data for the known vehicle, the color data for the additional known vehicle, and the data identifying an action to be performed by known vehicle and an action to be performed by the additional known vehicle.

11. The monitoring system of claim 10, wherein the monitor control unit is configured to:

compare the frames of the video data to the image of the known vehicle by comparing the frames of the video data to both the image of the known vehicle and the additional image of the additional known vehicle;

based on comparing the frames of the video data to the image of the known vehicle, determine a first confidence score that reflects a likelihood that the vehicle in the vicinity of the property matches the known vehicle and determine a second confidence score that reflects a likelihood that the vehicle in the vicinity of the property matches the additional known vehicle;

compare the first confidence score that reflects a likelihood that the vehicle in the vicinity of the property matches the known vehicle and the second confidence score that reflects a likelihood that the vehicle in the vicinity of the property matches the additional known vehicle to a confidence score threshold;

based on comparing the first confidence score and the second confidence score, determine that the first confidence score does not satisfy the confidence score threshold and the second confidence score satisfies the confidence score threshold;

based on determining that the first confidence score does not satisfy the confidence score threshold and the second confidence score satisfies the confidence score threshold, identify an action that is performed by the vehicle;

determine whether the action performed by the vehicle matches the action to be performed by the additional known vehicle;

based on determining that the action performed by the vehicle matches the action to be performed by the additional known vehicle;

identifying a monitoring system action that corresponds to the action performed by the vehicle by identifying the monitoring system action of opening a garage door of the property; and perform the monitoring system action by opening the garage door.

12. The system of claim 1 wherein, the monitoring control unit is configured to:

receive, from the sensor, additional sensor data;

receive, from the camera, additional video data;

based on the additional sensor data and the additional video data, determine that an additional vehicle is in the vicinity of the property;

compare frames of the additional video data to an image of a known vehicle;

based on comparing the frames of the additional video data to the image of the known vehicle, determine a confidence score that reflects a likelihood that the additional vehicle in the vicinity of the property matches the known vehicle;

based on determining that the confidence score that reflects the likelihood that the additional vehicle in the vicinity of the property matches the known vehicle does not satisfy a confidence score threshold, perform a monitoring system action by arming the monitoring system and maintaining a garage door in a closed state.

13. The system of claim 12, wherein the monitoring control unit is configured to perform a monitoring system action by generating an audible alarm at the property.

14. The system of claim 12, wherein the monitoring control unit is configured to:

communicate a notification to a user device of a resident of the property, the notification indicating that the additional vehicle is in the vicinity of the property, and including one or more images of the additional vehicle;

receive, from the user device of a resident of the property, data indicating that the additional vehicle in the vicinity of the property should be granted access to the property;

based on receiving data indicating that the additional vehicle in the vicinity of the property should be granted access to the property, disarming the monitoring system and opening the garage door;

storing the one or more images of the additional vehicle; and updating a list of known vehicles to include the additional vehicle.

15. The system of claim 1, wherein the monitoring control unit is configured to:

receive data indicating that the action to be performed by the vehicle is a distress signal;

identify the action that is performed by the vehicle by identifying the distress signal;

identify a monitoring system action that corresponds to the action performed by the vehicle by identifying the monitoring system action of contacting authorities based on the distress signal corresponding to a known distress signal; and perform the monitoring system action by contacting the authorities.

16. A computer-implemented method, comprising:

receiving, by a monitoring system that is configured to monitor a property and from a sensor of the monitoring system, sensor data;

receiving, by the monitoring system and from a camera, video data;

determining, by the monitoring system, that a vehicle is in a vicinity of the property based on the sensor data and the video data;

comparing, by the monitoring system, frames of the video data to an image of a known vehicle;

based on comparing the frames of the video data to the image of the known vehicle, determining, by the monitoring system, a confidence score that reflects a likelihood that the vehicle in the vicinity of the property matches the known vehicle;

based on determining that the confidence score that reflects the likelihood that the vehicle in the vicinity of the property matches the known vehicle satisfies a confidence score threshold, identifying, by the monitoring system, an action that is performed by the vehicle by:
  identifying a series of high beam and low beam headlight emissions from the vehicle; or
  identifying a left hand side indicator switching on for a first period of time followed by a right hand side indicator switching on for a second period of time;
identifying a monitoring system action that corresponds to the action performed by the vehicle; and
performing the monitoring system action.

17. The method of claim 16, wherein performing the monitoring system action comprises opening a garage door.

18. The method of claim 16, wherein performing the monitoring system action comprises opening a garage door and closing the garage door a set period of time after determining that a door from the garage into the property is opened.

\* \* \* \* \*